Patented June 27, 1939

2,163,651

UNITED STATES PATENT OFFICE 2,163,651

MANUFACTURE OF NORMAL, SECONDARY PENTADECYL SULPHATES

James Herbert Werntz, Wilmington, Del., assignor to E. I. du Pont de Nemours & Company, Wilmington, Del., a corporation of Delaware No Drawing. Application July 13, 1937,
Serial No. 153,365

12 Claims. (Cl. 260—459)

This invention relates to new chemical compounds, their methods of production, and their technical uses, and more particularly to the manufacture and utilization of normal, secondary pentadecyl sulphates.

This invention has as an object the preparation of a number of new chemical compounds which have surface active properties. A further object is to manufacture these new chemical compounds by novel and easily conducted processes which give high yields of relatively high quality products. A still further object is to apply these new compounds in various connections wherein surface active compounds are commonly employed. Other objects will appear hereinafter.

These objects are accomplished by the following invention which relates to the production and uses of normal, secondary, pentadecyl sulphates.

The following examples will serve to illustrate how the invention may be practiced.

Example 1

Sodium pentadecyl-8 sulphate.—15 parts by weight of pentadecanol-8 was dissolved in 72 parts by weight of anhydrous ethyl ether, and a solution of 6.9 parts by weight of chlorosulphonic acid dissolved in 7.2 parts by weight of ethyl ether was added thereto over a period of 15 minutes, during which time the temperature was held at 0° C. The reaction mixture was stirred one-half hour after all the acid had been added and was then poured into 200 parts by weight of ice and neutralized with a 10% aqueous sodium hydroxide solution using phenolphthalein as the indicator. The ether layer was separated from the aqueous layer and was extracted with 230 parts by weight of a mixture of equal quantities of methanol and water. The ether layer was evaporated and gave a residue of 3.6 parts by weight of unsulphated alcohol. The methanol-water solution was combined with the original water solution and heated on a steam bath to drive off the methanol. The water solution of sodium pentadecyl-8 sulphate was clear and foamed readily. An aqueous solution of the sodium sulphate of pentadecanol-8 wet cotton linters in 25 seconds at a concentration of 0.31 g. per liter when tested by the method of Draves and Clarkson (American Dyestuffs Reporter 20, 201, 1931).

Example 2

Sodium pentadecyl-8 sulphate.—5.2 parts by weight of chlorosulphonic acid was dissolved in 16 parts by weight of pyridine. The temperature at first was held at 0–10° C. and then allowed to rise to 30° C. To this mixture was added a solution of 10 parts by weight of pentadecanol-8 in 30 parts by weight of pyridine. It required one hour for this addition, during which time the temperature was held between 40 and 45° C. After stirring 30 minutes, the solution was poured into 200 parts by weight of ice and neutralized with a 10% aqueous sodium hydroxide solution. The solution was then evaporated on the steam bath under reduced pressure, and the dried product dissolved in 197 parts by weight of methanol. The resulting suspension was filtered to remove inorganic salts, and about 125 parts by weight of water was added to the methanol solution, which was then extracted twice with petroleum ether to remove unsulphated alcohol. A white, waxy product was obtained by evaporating the extracted solution on the steam bath under reduced pressure.

Example 3

Sodium pentadecyl-4 sulphate.—6.9 parts by weight of chlorosulphonic acid was dissolved in 7.2 parts by weight of ethyl ether and added to 15 parts by weight of pentadecanol-4 dissolved in 72 parts by weight of ethyl ether. The addition required 15 minutes, during which time the temperature was held at 0° C. Stirring was continued 45 minutes longer, and the reaction mixture was poured into 200 parts by weight of ice. It was neutralized with a 10% aqueous sodium hydroxide solution using phenolphthalein as the indicator. The two layers were separated, and the ether layer was extracted with a mixture of equal quantities of methanol and water which was then combined with the original aqueous layer. The methanol-water solution was extracted twice with petroleum ether to remove unsulphated alcohol and evaporated on the steam bath to remove methanol. The water solution of sodium pentadecyl-4 sulphate was clear and foamed. The solution wet cotton linters in 25 seconds at a concentration of 0.36 g. per liter when tested by the method of Draves and Clarkson.

Example 4

Sulphation of a mixture of alcohols containing a large amount of pentadecanol-8.—Coconut oil acids were fractionated to obtain a mixture of acids which contained approximately 72% caprylic acid, 24% capric acid, and 4% caproic acid. This mixture of acids was converted to the corresponding ketones which were then hydrogenated to give a mixture of pentadecanol-8, heptadecanol-8, nonadecanol-10, etc. This mixture of alcohols was sulphated by the procedure described under Example 1. The water solution of the mixture of sodium pentadecyl-8 sulphate, sodium nonadecyl-10 sulphate, etc., was clear and foamed readily. An aqueous solution of these sulphates wet a cotton skein in 25 seconds at a concentration of 0.4 g. per liter when tested by the method of Draves and Clarkson.

It is well known that the sulphates of long chain primary alcohols such as dodecyl sodium sulphate and hexadecyl sodium sulphate are surface active. I have now found that the sulphates of long chain secondary alcohols are also surface active and for specific applications such as for use in the wetting of various materials are superior to the primary alcohol sulphates. I have also found that maximum wetting efficiency is found in the secondary alcohol sulphates which contain 15 carbon atoms in a straight chain. I have discovered that the closer the sulphate group is to the middle of the straight 15 carbon atom chain the more efficient are the products as wetting agents. Thus, the sulphate of pentadecanol-8 is more surface active than the sulphate of pentadecanol-7, which in turn is a better wetting agent than the sulphate of pentadecanol-6 and so on to the sulphate of pentadecanol-2, which is the least effective. The sulphates in which the carbon atoms are in a straight chain have higher activity than the sulphates, in which the carbon atoms are in a branched chain.

In the preparation of the sulphates of the present invention, I may employ any secondary straight chain alcohol of the formula $C_{15}H_{31}OH$. I prefer to use pentadecanol-8, pentadecanol-7, pentadecanol-6, pentadecanol-5, pentadecanol-4, and pentadecanol-3. I may, however, use olefins of the formula $C_{15}H_{30}$ in which the carbon atoms are in a straight chain, and the unsaturated bond is near the middle of the chain.

I may employ any mixture of secondary straight chain alcohols of the formula $C_{15}H_{31}OH$ as intermediates for sulphation. Further, in the practice of my invention, I may employ mixtures of straight chain alcohols which contain at least 50% of a secondary straight chain alcohol of the formula $C_{15}H_{31}OH$ and preferably at least 50% of pentadecanol-8 when the sulphates are to be used as wetting agents. My invention also comprehends the sulphation of pentadecanol-2 as one of its less preferred embodiments.

As may be seen from the preceding paragraphs, the preferred embodiment of this invention relates to the sulphation of pentadecanol-8. While the invention extends to the preparation of any normal, secondary, pentadecyl sulphate, it is preferred that the sulphate group be situated on the third, fourth, fifth, sixth, seventh, or eighth carbon atom of the normal pentadecane molecule. Hence, the products of this invention generically have the formula:

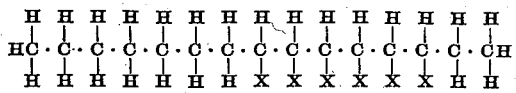

wherein one of the X's represents a sulphate group and all of the other X's stand for hydrogen. In speaking of a normal secondary pentadecyl sulphate in this application, I intend to refer only to a secondary straight chain pentadecyl sulphate.

The capillary active products of this invention are preferably obtained by treating a normal secondary pentadecanol with a sulphating agent such as sulphuric acid, sulphur trioxide, or chlorosulphonic acid. In carrying out the sulphation of the normal secondary pentadecanol, it is preferred to operate in a suitable inert solvent, such as beta beta dichloro-ethyl ether, carbon tetrachloride, trichloroethylene, etc., and at temperatures of —10° C. to 50° C., although lower and higher temperatures may be used. The preferred solvents are ethyl ether and pyridine. When ethyl ether is employed as the solvent, it is advisable to maintain a temperature of about 0° C. during the sulphation process. When pyridine is used as a solvent, the sulphation reaction is usually carried out at temperatures between 40 and 45° C. I prefer to use chlorosulphonic acid for sulphating normal, secondary, pentadecanols.

The sulphated normal, secondary, pentadecanols may be used as such, but generally they are converted to their alkali metal salts by neutralization with an alkali metal hydroxide, such as sodium hydroxide. The potassium, ammonium, calcium, and magnesium salts may also be prepared and used. Suitable salts of normal, secondary, pentadecyl sulphates may also be made from such amines as dimethyl amine, ethyl amine, triethanol amine, butyl amine, glucamine, methyl glucamine, pyridine, piperidine, cyclohexyl amine, aniline, toluidine, etc. When in this application I mention a normal, secondary, pentadecyl sulphate, I intend to refer generically to the sulphate irrespective of how or whether the acid hydrogen of the sulphate group may have been neutralized.

By comparative tests it has been found that sodium pentadecyl-4 sulphate and sodium pentadecyl-8 sulphate are better wetting agents than sodium isopropyl naphthalene sulphonate, sodium dodecyl sulphate, sodium hexadecyl-2 sulphate, and the sodium salts of the sulphuric acid esters of 5-ethyl nonanol-2 and 5,11 diethyl pentadecanol-8. These comparative tests were conducted by the method of Draves and Clarkson, which is described in American Dyestuffs Reporter 20, 201 (1931).

The new compositions covered in this case belong to the class of surface active or capillary active materials in that they have colloidal properties and may, therefore, be advantageously used in any process involving wetting, penetrating, deterging, dispersing, emulsifying, frothing, foaming, and kindred phenomena. These compositions may be employed in pure or standardized form and, if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with other suitable detergents for cleansing and scouring vegetable and animal fibers when removing fatty or oily materials. When added to flax retting baths, they function as wetting and penetrating agents. They may be employed as assistants in fulling and felting processes. They may be used in sizing preparations in combination with the usual materials such as starches or gelatine or their equivalents, clays, talcs, or their equivalents, weighting salts such as magnesium sulphate or calcium chloride, oils and oils processed by oxidation, polymerization, sulphonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, water-proofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions. They can also be used to assist in twist setting in yarn and in processes of stripping colors.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulphur dyes in a finely divided condition. As penetrants and wetting agents they assist in producing level dyeing in neutral, slightly acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber. Solutions of these compounds are useful for increasing the fastness of dyeings on textile materials. Solutions of these compounds may be used for increasing the affinity of textile fibers of vegetable origin for acid-chrome dyestuffs. These compounds may be used as assistants in resist printing processes.

In the leather industry these compositions function as useful wetting agents in soaking, deliming, bating, tanning, and dyeing baths. They are useful in softening and treating baths for hides and skins, particularly in baths used for fat-liquoring leather, and in processes of water-proofing leather. Solutions of these compounds are useful for pretreating leather prior to dyeing.

The dispersing and emulsifying powers of these new compositions give rise to many interesting uses. They may be utilized for converting liquid or solid substances normally insoluble in water, such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude or reclaimed rubber. They may be used in the preparation of non-spattering margarines and as emulsifiers in the manufacture of cosmetic preparations such as cold creams and lipsticks. They may be employed for preparing emulsions of the water-in-oil type such as emulsions of water in such organic solvents as are used in the dry cleaning industry.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, slightly acid, or alkaline liquors. They may be used for paint, varnish, and lacquer cleaners. They may be added to soap in hard water baths, since these compositions do not form precipitates so readily in hard waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used to stabilize rubber latex. They may also be used as frothing and collecting agents in ore flotation processes, and in other processes such as the recovery of fixed oil from the oil sands. The uses mentioned will suggest many similar ones.

The above description and examples are intended to be illustrative only and not to limit the scope of the invention. Any departure therefrom which conforms to the spirit of the invention is intended to be included within the scope of the appended claims.

I claim:

1. A normal, secondary, pentadecyl sulphate.
2. A normal, secondary, pentadecyl sulphate having the general formula:

$$\text{HC} \cdot \overset{\text{H}}{\underset{\text{H}}{\text{C}}} \cdot \overset{\text{H}}{\underset{\text{H}}{\text{C}}} \cdot \overset{\text{H}}{\underset{\text{H}}{\text{C}}} \cdot \overset{\text{H}}{\underset{\text{H}}{\text{C}}} \cdot \overset{\text{H}}{\underset{\text{H}}{\text{C}}} \cdot \overset{\text{H}}{\underset{\text{H}}{\text{C}}} \cdot \overset{\text{H}}{\underset{\text{X}}{\text{C}}} \cdot \overset{\text{H}}{\underset{\text{X}}{\text{C}}} \cdot \overset{\text{H}}{\underset{\text{X}}{\text{C}}} \cdot \overset{\text{H}}{\underset{\text{X}}{\text{C}}} \cdot \overset{\text{H}}{\underset{\text{X}}{\text{C}}} \cdot \overset{\text{H}}{\underset{\text{X}}{\text{C}}} \cdot \overset{\text{H}}{\underset{\text{H}}{\text{C}}} \cdot \overset{\text{H}}{\underset{\text{H}}{\text{C}}} \text{H}$$

wherein one of the X's represents a sulphate group and all of the other X's stand for hydrogen.

3. A normal pentadecyl-8-sulphate.
4. An alkali metal salt of a normal, secondary, pentadecyl sulphate.
5. A process of preparing an alkali metal salt of a normal, secondary, pentadecyl sulphate which comprises reacting a normal, secondary pentadecanol with chlorosulphonic acid in an inert, anhydrous, organic solvent and neutralizing the sulphated pentadecanol with an aqueous solution of an alkali metal hydroxide.
6. Sodium pentadecyl-8 sulphate.
7. A process of making sodium pentadecyl-8 sulphate which comprises reacting pentadecanol-8 with chlorosulphonic acid in an anhydrous organic solvent and neutralizing the sulphated pentadecanol-8 with an aqueous solution of sodium hydroxide.

8. A process of making sodium pentadecyl-8 sulphate which comprises adding a dry ethyl ether solution of chlorosulphonic acid to a dry ethyl ether solution of pentadecanol-8, stirring the reaction mixture, and neutralizing the sulphated pentadecanol-8 with an aqueous solution of sodium hydroxide.

9. A process of making sodium pentadecyl-8 sulphate which comprises mixing a pyridine solution of chlorosulphonic acid with a pyridine solution of pentadecanol-8, stirring the reaction mixture, neutralizing the sulphated pentadecanol-8 with an aqueous solution of sodium hydroxide, removing inorganic salts and unsulphated pentadecanol-8 from the neutralized product, and drying the thus purified product.

10. A normal pentadecyl-4 sulphate.
11. Sodium pentadecyl-4 sulphate.
12. A normal pentadecyl-6 sulphate.

JAMES HERBERT WERNTZ.

DISCLAIMER 2,163,651.—*James Herbert Werntz*, Wilmington, Del. MANUFACTURE OF NORMAL, SECONDARY, PENTADECYL SULPHATES. Patent dated June 27, 1939. Disclaimer filed February 16, 1942, by the assignee, *E. I. du Pont de Nemours and Company*.

Hereby enters this disclaimer to claims 1, 2, 3, 4, 5, 6, 7, 10, 11, and 12.

[*Official Gazette March 17, 1942.*]